(12) United States Patent
Robinson et al.

(10) Patent No.: US 11,733,684 B2
(45) Date of Patent: Aug. 22, 2023

(54) OVERLAYING PRODUCTION DATA ON RENDERED 3D PRINTED OBJECT

(71) Applicant: HEWLETT-PACKARD DEVELOPMENT COMPANY, L.P., Spring, TX (US)

(72) Inventors: Ian N. Robinson, Palo Alto, CA (US); Mary G. Baker, Palo Alto, CA (US); Ji Won Jun, Palo Alto, CA (US); Alexandra Ju, Palo Alto, CA (US); Rafael Ballagas, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/052,167

(22) PCT Filed: Sep. 27, 2018

(86) PCT No.: PCT/US2018/053141
§ 371 (c)(1),
(2) Date: Oct. 30, 2020

(87) PCT Pub. No.: WO2020/068086
PCT Pub. Date: Apr. 2, 2020

(65) Prior Publication Data
US 2021/0354393 A1    Nov. 18, 2021

(51) Int. Cl.
*G05B 19/418*    (2006.01)
*B33Y 50/00*    (2015.01)

(52) U.S. Cl.
CPC ........ *G05B 19/41865* (2013.01); *B33Y 50/00* (2014.12)

(58) Field of Classification Search
CPC ................ B29C 64/386; B29C 64/393; G05B 19/41865; G06F 3/1208; G06T 19/006; G06T 11/60; B33Y 50/00
See application file for complete search history.

(56) References Cited

U.S. PATENT DOCUMENTS

| | | | |
|---|---|---|---|
| 9,094,670 B1 * | 7/2015 | Furio | ...................... G06T 19/20 |
| 9,336,629 B2 | 5/2016 | Finn et al. | |
| 9,380,179 B2 | 6/2016 | Sugimoto | |
| 9,511,291 B2 | 12/2016 | Lyons et al. | |
| 9,530,250 B2 | 12/2016 | Mazula | |

(Continued)

FOREIGN PATENT DOCUMENTS

| | | | | |
|---|---|---|---|---|
| KR | 101748245 B1 * | 6/2017 | ............. | G06F 17/30 |
| WO | WO-2016133679 A1 | 8/2016 | | |

*Primary Examiner* — Alicia M. Choi
(74) *Attorney, Agent, or Firm* — Quarles & Brady LLP

(57) ABSTRACT

An example system includes an identification engine to determine production data associated with a three-dimensionally printed object. The system also includes an alignment engine to determine a placement of the three-dimensionally printed object relative to a display device. The system includes a rendering engine to generate an image including a visual representation of the production data. The rendering engine is to position the visual representation of the production data so that representations of data points in the production data will overlay corresponding portions of the three-dimensionally printed object upon displaying by the display device.

15 Claims, 7 Drawing Sheets

(56) References Cited

U.S. PATENT DOCUMENTS

| | | |
|---|---|---|
| 9,633,481 B2 | 4/2017 | Persely et al. |
| 9,776,364 B2 | 10/2017 | Wang |
| 2007/0003128 A1 | 1/2007 | Anderson |
| 2009/0089660 A1* | 4/2009 | Atkins .................. G06F 40/106 |
| | | 715/243 |
| 2011/0210104 A1 | 9/2011 | Wahlsten |
| 2012/0327117 A1* | 12/2012 | Weller .................. G06T 19/006 |
| | | 345/633 |
| 2014/0039663 A1* | 2/2014 | Boyer .................... B33Y 50/02 |
| | | 700/118 |
| 2014/0079383 A1* | 3/2014 | Lo .......................... G03B 27/68 |
| | | 396/322 |
| 2015/0042678 A1* | 2/2015 | Alt ...................... G06F 3/04815 |
| | | 345/633 |
| 2015/0134096 A1 | 5/2015 | Travers |
| 2016/0240011 A1* | 8/2016 | Fedosov ................ G06F 3/011 |
| 2016/0246908 A1* | 8/2016 | Komzsik ................ B29C 67/00 |
| 2016/0307083 A1* | 10/2016 | Kumar ............... G05B 19/4099 |
| 2017/0103510 A1* | 4/2017 | Wang ........................ G06T 7/33 |
| 2017/0109888 A1* | 4/2017 | de Lima .............. H04N 13/257 |
| 2017/0118374 A1* | 4/2017 | Tsujiguchi .............. G06F 3/147 |
| 2017/0140512 A1 | 5/2017 | Hemani et al. |
| 2017/0220031 A1* | 8/2017 | Morovic, Jr. .......... B33Y 50/02 |
| 2017/0256068 A1* | 9/2017 | Wang ...................... G06T 7/337 |
| 2018/0114363 A1 | 4/2018 | Rosenbaum |
| 2019/0068889 A1* | 2/2019 | Lee .................. H04N 5/232935 |
| 2020/0265644 A1* | 8/2020 | Kharisov ............... G06T 19/006 |
| 2021/0387421 A1* | 12/2021 | Putman .............. G06F 18/2411 |

\* cited by examiner

FIG. 3 300

```
Map a Plurality of Data Points from Printing Data to Points in
an Image of a Three-Dimensionally Printed Object
302
           │
Generate Visual Representations of the Plurality of Data Points
304
           │
Generate an Image that includes the Visual Representations of
the Plurality of Data Points
306
```

OVERLAYING PRODUCTION DATA ON RENDERED 3D PRINTED OBJECT

BACKGROUND

Objects may be manufactured using various methods. For example, objects may be manufactured by casting, molding, stamping, computer numerical control, or the like. Objects may be manufactured by three-dimensional (3D) printing. In three-dimensional printing, materials may be selectively joined to produce the manufactured object. For example, three-dimensional printing may include selectively depositing a filament or other material, may include selectively sintering, binding, fusing, or solidifying material, or the like.

BRIEF DESCRIPTION OF THE DRAWINGS

FIG. 3 is a flow diagram of an example method to generate images to overlay on a manufactured object.

DETAILED DESCRIPTION

After manufacturing, various additional processes may be performed on a manufactured object. For example, manufactured objects may be tested or evaluated to determine characteristics of the object, such as its reliability or performance, to detect defects in the manufactured object, or the like. Parameters of the design or manufacture may be adjusted based on the testing or evaluation. Manufactured objects may be further processed to change the structural or aesthetic characteristics, to join the manufactured object with additional objects, or the like.

Such additional processes may suffer various drawbacks. For example, testing or evaluation may be destructive and cause the manufactured object to be unusable after the testing or evaluation. Similarly, changes to the structural or aesthetic characteristics or the joining of the object with additional objects may be irreversible or may create irreversible changes in the manufactured object. Accordingly, the manufactured object may be unusable to apply other processes, and additional objects may be manufactured to apply the other processes. When many variations on design, manufacturing, or processes are possible, many objects may be manufactured to evaluate the results of the variations in the design, manufacturing, or processes.

Moreover, diagnosing defects or determining the relationship between design or manufacturing parameters and resulting properties may be time consuming or difficult. The design of the object or the manufacturing process may generate large amounts of data. For example, a three-dimensional printer may capture data about each layer printed, such as temperatures at various locations, an amount of energy applied, an amount of material at a location, an amount of agent delivered to a location, a type of material or agent at each location, etc., as well as data about part spacing, part orientation, etc. However, it may be difficult for a person to analyze such large amounts of data to determine the cause of a defect or the relationship between the design or the manufacturing parameters and the resulting properties of the manufactured object. Accordingly, manufacturing of objects could be improved by providing people with more efficient ways to apply further processes to manufactured objects, diagnose object defects, determine relationships between manufacturing parameters and resulting properties, and the like.

Figure 1:
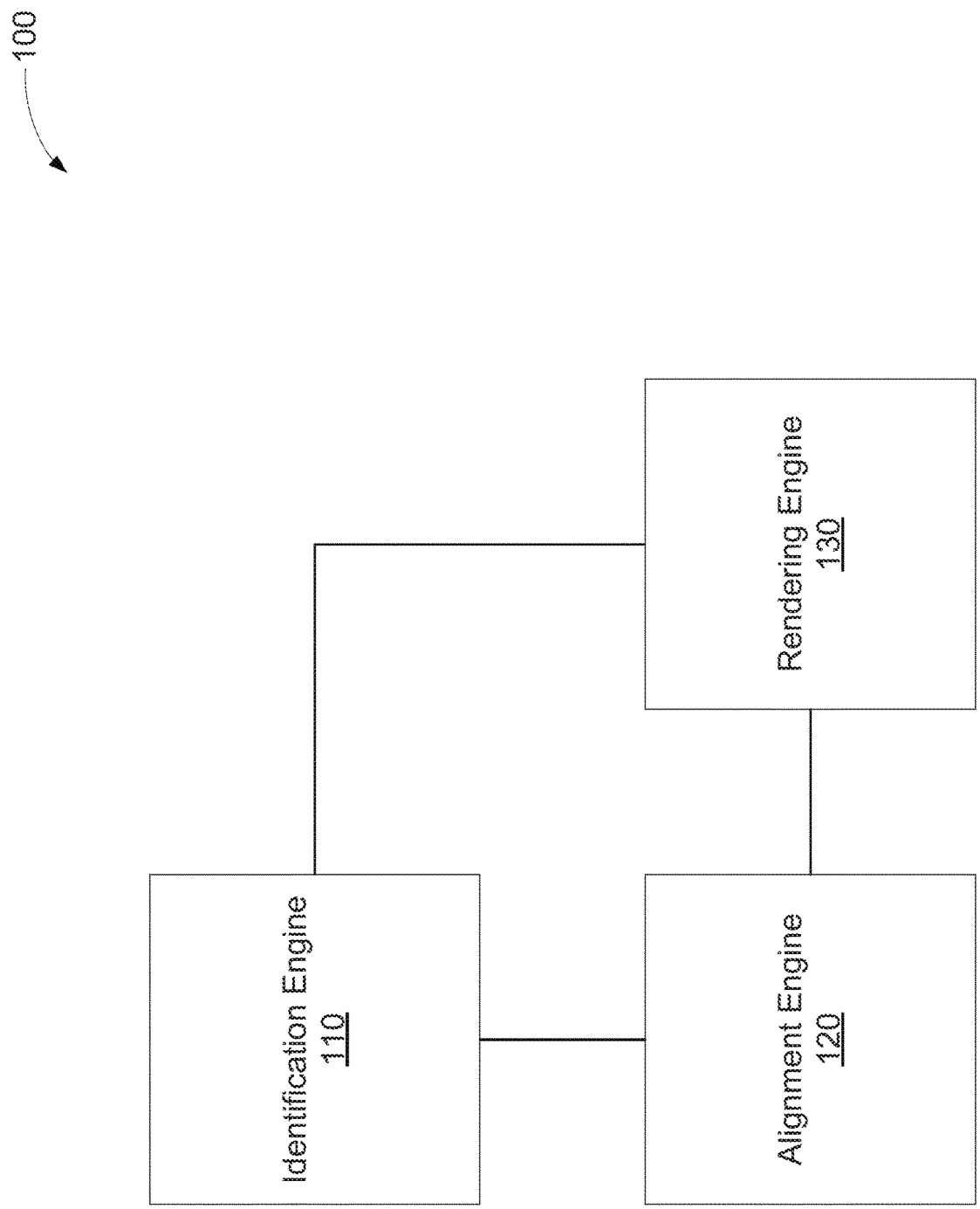
FIG. 1 is a block diagram of an example system to generate images to overlay on a manufactured object.

FIG. 1 is a block diagram of an example system 100 to generate images to overlay on a manufactured object. The system 100 may include an identification engine 110. As used herein, the term "engine" refers to hardware (e.g., a processor, such as an integrated circuit or other circuitry) or a combination of software (e.g., programming such as machine- or processor-executable instructions; commands, or code such as firmware; a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The identification engine 110 may determine production data associated with a manufactured object, such as a three-dimensionally printed object. For example, the identification engine 110 may identify the manufactured object. The identification engine 110 may also, or instead, retrieve the production data based on the identity of the manufactured object. As used herein, the term "production data" refers to data generated during the design, pre-manufacturing processing, or manufacture of the manufactured object.

The system 100 may include an alignment engine 120. The alignment engine 120 may determine a placement of the manufactured object relative to a display device. As used herein, the term "placement" of an object refers to the position or orientation of an object. Determining the position of the object may include determining the apparent size of the object in an image plane. In some examples, the display device may be transparent so that objects behind the display device are visible. The alignment engine 120 may determine the position or orientation of the manufactured object relative to the transparent display as viewed by a user. In an example, the display device may display an image that includes the manufactured object. The alignment engine 120 may determine the position (e.g., a position within an image plane for the displayed image), orientation, or apparent size of the manufactured object within the displayed image.

The system 100 may include a rendering engine 130. The rendering engine 130 may generate an image including a visual representation of the production data. The rendering engine 130 may produce a digital version of the image, and the values of elements of the digital version of the image may be selected based on the production data. In an example, the production data may not exist in a visual format or may be in a format different from the format to be used to represent the image. Accordingly, the rendering engine 130 may select suitable values for the elements of the digital version of the image based on production data corresponding to the elements.

The rendering engine 130 may position the visual representation of the production data so that representations of data points in the production data will overlay corresponding portions of the manufactured object upon displaying by the display device. Data points in the production data may correspond to locations on the manufactured object. The rendering engine 130 may be aware of the placement of the manufactured object from the alignment engine 120. The rendering engine 130 may determine from the placement of the manufactured object which elements in the digital representation of the image will overlay which locations on the manufactured object. The rendering engine 130 may determine the value for each element based on the data point in the production data corresponding to the overlaid location on the manufactured object. The rendering engine 130 thereby quickly produces an intuitive presentation of the relationship between the production data and the resulting manufactured object.

Figure 2:
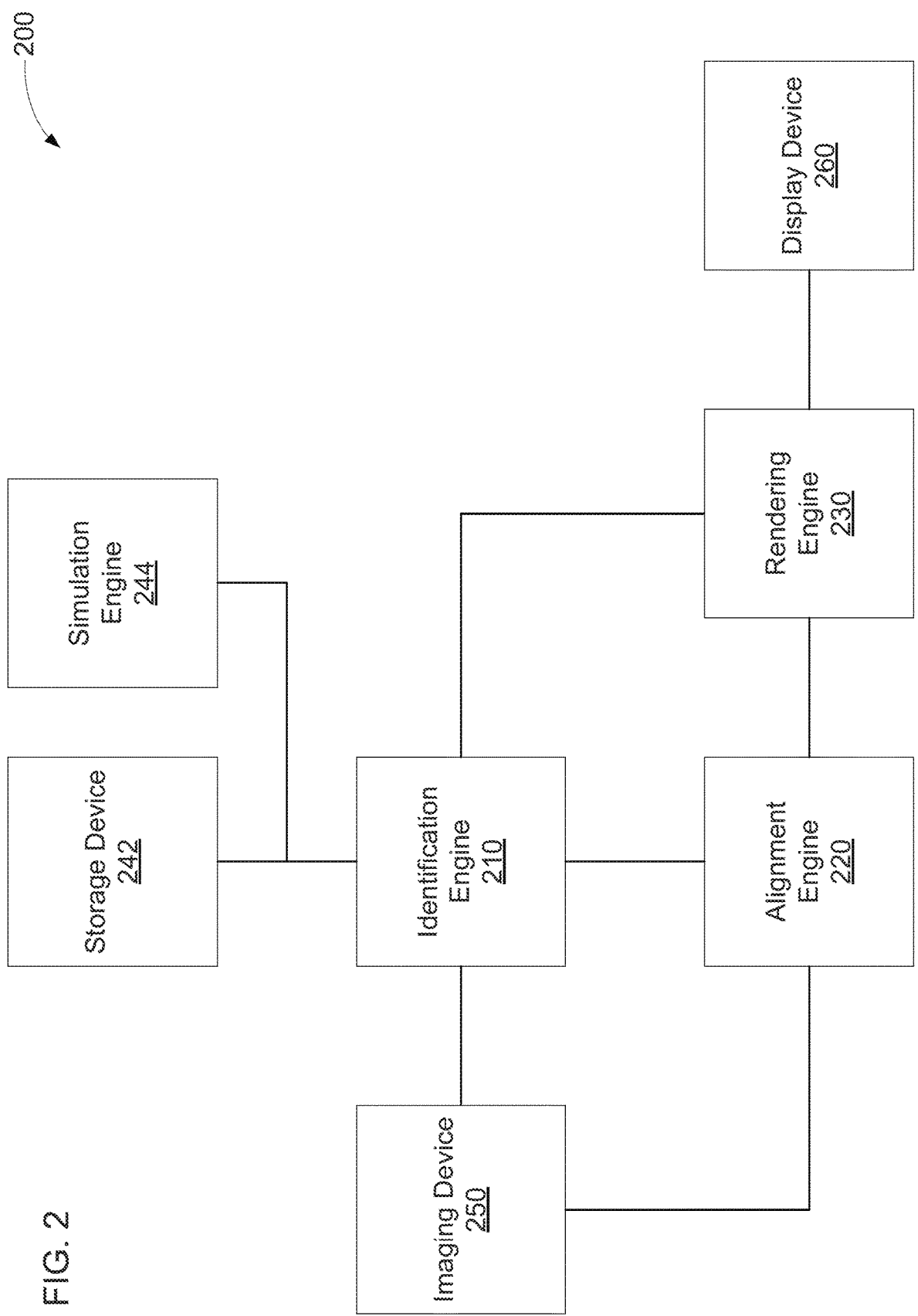
FIG. 2 is a block diagram of another example system to generate images to overlay on a manufactured object.

FIG. 2 is a block diagram of another example system 200 to generate images to overlay on a manufactured object. In some examples, the system 200 may include or may be implemented as a smartphone, a head mounted display, or the like. The system 200 may include an identification engine 210 and may include or be communicatively coupled to an imaging device 250. The imaging device 250 may be communicatively coupled to the identification engine 210. The identification engine 210 may determine production data associated with the three-dimensionally printed object. The imaging device 250 may capture an image of a manufactured object, such as a three-dimensionally printed object, and provide the image to the identification engine 210. In some examples, the identification engine 210 may identify the manufactured object in the image. The identification engine 210 may recognize the manufactured object using, for example, computer vision techniques, a neural network, or the like. In an example, the manufactured object may include a unique identifier (e.g., a barcode, OR code, steganographic information, etc.). The identification engine 210 may detect the unique identifier in the image and identify the manufactured object based on the unique identifier.

The identification engine 210 may retrieve the production data from a storage device 242. The identification engine 210 may retrieve the production data based on the identification of the object (e.g., based on the unique identifier). In the illustrated example, the system 200 includes the storage device 242, but in other examples, the identification engine 210 may retrieve the production data from a storage device distinct from the system 200 (e.g., a storage device communicatively coupled to the system 200). The production data may include data from the design of the manufactured object (e.g., data from a computer-aided design file or program or the like), data from pre-manufacturing processing (e.g., data from a preprocessing engine, such as a part packing engine for a three-dimensional printer, or the like), data from manufacture of the manufactured object (e.g., data from measurements during manufacture, predetermined data corresponding to operations during manufacture, or the like), etc. For example, the production data may include data generated during printing of a three-dimensionally printed object. The data may have been previously stored in a storage device 242 accessible to the identification engine 210, or the identification engine 210 may retrieve the production data from the systems producing data by communicating with those systems.

In an example, the production data may include metadata for a design file for the manufactured object, such as a file name, author, date, design engine version, etc., or may include notes by the author of the design file or by a later user. The production data may include the design of the object, such as a model, a mesh, or the like, for the manufactured object. The production data may include materials used, amount of material used, or the locations at which the materials were used or to be used during manufacture. The production data may include agents (e.g., fusing agents, detailing agents, coloring agents, etc.), amount of agents, or locations of agents used or to be used during manufacture. The production data may include the amount or location of energy to be delivered during manufactured. The materials, agents, or energy may be determined based on design data, pre-manufacturing data, or manufacturing data and thus may be determined based on intended or actual material, agent, or energy usage. The production data may include other objects manufactured with the manufactured object (e.g., other parts packed in the print bed with a three-dimensionally printed object) or the position or orientation of the manufactured object during manufacture. The production data may include temperatures (actual or predicted) at various locations on the manufactured object during manufacture. For example, a three-dimensional printer may capture an image (e.g., an infrared light image, a visible light image, etc.) of each layer formed by the three-dimensional printer. Accordingly, the images of the various layers may indicate the temperature of each layer of the manufactured object when that layer was being printed. The temperatures may be predicted based on the properties of the object being printed, other objects being printed, and the parameters and characteristics of the three-dimensional printer, such as using a machine learning model. The production data may include metadata associated with pre-manufacturing or manufacturing (e.g., date of preprocessing, date of manufacture, preprocessing engine version, three-dimensional printer version, a link to request production of additional objects, etc.).

The system 200 may include a simulation engine 244. The simulation engine 244 may simulate the results of a process acting on the manufacture object, and the production data may include the results of the simulated process. The identification engine 210 may retrieve the production data, including the results of the simulated process, from the simulation engine 244 or from a storage location in which the simulation engine 244 has stored the production data. In some examples, the simulation engine 244 may be in a separate system or may have performed a simulation prior to the identification engine 210 attempting to retrieve production data.

The results of the simulated process may include results of a simulated finishing process applied to the manufactured object (e.g., a post-processing operation, such as tumbling, dyeing, sand blasting, agent application, etc.). For example, the simulation engine 244 may derive the results of the finishing process based on post-processed samples (e.g., of the same material, with the same orientation during manufacture, etc.). The results of the simulated process may include results of a simulated test process applied to the manufactured object (e.g., results of a wind tunnel simulation, results of computational fluid dynamics calculations, deformation resulting from drop, impact, or forming simulation, or the like). The production data may include optical, electrical, or mechanical properties, such as transparency, conductivity, flexibility, strength, etc. The optical, electrical, or mechanical properties may be computed directly based on the material, dimensions, orientation during manufacture, etc. or may be produced from a simulation by the simulation engine 244 (e.g., a simulation based on measurements during manufacture).

The identification engine 210 may select the production data based on predetermined criteria. For example, the user may select a cross section to view, and the identification engine 210 may identify or retrieve production data for the selected cross section, e.g., without retrieving production data for other cross sections. The user may select a particular material or agent to view, and the identification engine 210 may identify or retrieve the production data for selected material or agent, e.g., without retrieving production data for other materials or agents. The user may select a physical property (e.g., conductive, insulative, transparent, opaque, etc.) or a threshold for a physical property (e.g., a threshold for a strength, flexibility, etc.), The system 200 may include an alignment engine 220. The alignment engine 220 may determine a placement of the manufactured object relative to a display device 260. The placement of the manufactured object may be used to create an augmented reality experience in which the production data is overlaid on the manufactured object. Accordingly, the alignment engine 220 may determine the placement of the manufactured object so that the production data can be overlaid at the correct position on the manufactured object. In an example, the alignment engine 220 may create a feature cloud based on a model of the manufactured object. For example, the identification engine 210 may retrieve the model of the manufactured object based on the identity of the manufactured object and provide the model of the manufactured object to the alignment engine 220. The production data may include the model of the manufactured object or may be distinct from the model of the manufactured object. The alignment engine 220 may recognize or track the manufactured object based on the feature cloud. If there is an insufficient number of points visible on the manufactured object for recognition or tracking with the feature cloud, the alignment engine 220 may warn the user, may determine a most likely alignment, may allow the user to manually adjust the alignment for future tracking, or the like. In an example, the alignment engine 220 may assist the user by snapping to a point on the feature cloud to a nearest feature on the object after receiving manual input.

The alignment engine 220 may also, or instead, use a marking on the manufactured object to recognize or track the manufactured object. The marking may be a unique identifier, such as the unique identifier used by the identification engine 210 to identify to the manufactured object. For example, when the manufactured object is symmetric, the alignment engine 220 may use the marking to distinguish otherwise symmetric sides of the manufactured object. The marking may be a marking intentionally included during manufacture of the manufactured object, or the alignment engine 220 may detect minor defects or variations resulting from manufacture of the manufactured object.

The system 200 may include a rendering engine 230. The rendering engine 230 may generate an image including a visual representation of the production data. In some examples, the display device 260 may be a transparent display device, and the rendering engine 230 may determine content to be displayed at some locations but leave other locations in the image blank so the user can see through the display. The display device 260 may not be transparent and may instead display images captured by the imaging device 210. The rendering engine 230 may determine content to be displayed at some locations and replace or modify picture elements in the image captured by the display device at those locations. The rendering engine 230 may leave other locations in the image unchanged.

The rendering engine 230 may position the visual representation of the production data so that representations of data points in the production data will overlay corresponding portions of the manufactured object upon displaying by the display device 260. The data points in some production data may correspond to points on the manufactured object. Accordingly, based on the placement of the manufactured object determined by the alignment engine 220, the rendering engine may position the visual representation of each data point at the location in the image that will cause the visual representation to replace or appear at the location of the corresponding point on the manufactured object.

The production data may be in a format other than an image format. The rendering engine 230 may determine a visual representation for each data point in the production data. For example, the rendering engine 230 may represent each data point with various color information selected based on the value of that data point. As used herein, the term "color information" includes the color, chroma, saturation, hue, value, lightness, or luminance. The rendering engine 230 may scale the values of the data points to correspond to the range of possible representations. The rendering engine 230 may include the representation corresponding to the scaled value in the generated image.

In an example in which the production data includes metadata associated with a design file, pre-manufacturing, or manufacturing, the metadata may be displayed adjacent to or on top of the manufactured object. For example, the rendering engine 230 may select a location aligned with the object, that minimizes obscuring of the manufactured object, or the like. For production data including a design model, mesh, or the like for the manufactured object, the rendering engine 230 may overlay portions of the design model, mesh, or the like corresponding to visible portions of the manufactured object on those visible portions of the manufactured object. For production data including materials, agents, or energy used, the rendering engine 230 may include in the image a visual representation of the amount of material, agent, or energy used at each location (e.g., represented using color information) or show locations including a particular material or agent or that received energy. For production data including actual or predicted temperatures, the rendering engine 230 may include in the image visual representations of the temperature at each location (e.g., represented using color information).

For results from simulated finishing processes, the rendering engine 230 may obscure the manufactured object and replace it with the results, or the rendering engine 230 may include representations that combine with visible aspects of the manufactured object to provide the results. For simulations of fluid, such as wind, the rendering engine 230 represent the motion of the fluid over or adjacent to the manufactured object. For simulations that affect the shape of the manufactured object (e.g., deform or break the manufactured object), the rendering engine 230 may obscure the manufactured object and replace it with an affected version or include a visual representation that a location is affected overlaid on the location affected. For optical, electrical, or mechanical properties, the rendering engine 230 may include a visual representation of that property at each location (e.g., represented using color information). In some examples, the rendering engine 230 may allow the user to save or export an image including simulation results or data of the simulation results (e.g., an appearance of the object after a finishing process, the analytical results from a test process, or the like) for later viewing by the user or a different user.

For position or orientation during manufacture (e.g., in a print bed), the rendering engine 230 may obscure the manufactured object and replace it with a representation of the manufactured object having the position or orientation that existed during manufacture. In an example, the rendering engine 230 may include in the image information adjacent to the manufactured object that indicates its position or orientation during manufacture. The rendering engine 230 include an arrow indicating the direction of gravity (or opposite the direction of gravity) as existed during manufacture, an outline of the print volume, an outline of the manufacturing equipment, such as an outline of a three-dimensional printer, oriented and positioned as existed during manufactured, or the like. For example, the three-dimensional printer may appear rotated counter-clockwise 90 degrees if the object was rotated clockwise 90 degrees during printing but is now standing upright. For other objects manufactured with the manufactured object, the rendering engine 230 may also include in the image those other objects at the same relative locations at which they were positioned during manufacture. For example, the rendering engine 230 may show any objects in a print bed that were near the manufactured object during printing.

The user may be able to evaluate numerous incompatible further processes to determine how they will affect the manufactured object, simulate destructive, or the like using a single object. The user may diagnose object defects or determine improvements to the manufacturing process efficiently. For example, the user may visually determine from simulation results that a location on a manufactured object would introduce turbulence to a laminar flow. The user may display temperature information over the manufactured object and determine the problematic location resulted from too high a temperature at that location during manufacture. The user may examine the locations of nearby objects during manufacture and see that the high temperature resulted from another object being nearby. The user may display detailing agent usage and determine that additional detailing agent cannot be used to mitigate the problem. The user may determine the problem can be mitigated by adjusting a buffer distance between the manufacture object and the nearby object.

The rendering engine 230 may allow the user to make notes or modify a design, printing parameters, or the like and save the notes or modifications in association with a model of the manufactured object, intermediate files from manufacturing the object, or the like. The notes or modifications to the design, printing parameters, or the like may be production data that can be retrieved by the identification engine 210 and overlaid on the manufactured object by the rendering engine 230. For example, the printing parameters may include maximum temperature, amount of agent to deliver, minimum distance to another object, or the like. In an example, the metadata displayed by the rendering engine 230 may include a link to print additional objects. The rendering engine 230 may include an option when the link is selected to print the additional objects with modifications to the design, printing parameters, etc. indicated by the user.

FIG. 3 is a flow diagram of an example method 300 to generate images to overlay on a three-dimensionally printed object. The method 300 is described in reference to a three-dimensionally printed object but may be applied to manufactured objects manufactured with techniques other than three-dimensional printing. A processor may perform the method 300. At block 302, the method 300 may include mapping a plurality of data points from printing data generated during printing of a three-dimensionally printed object to points in an image of the three-dimensionally printed object. For example, a feature cloud or a marking may be used to determine locations on the three-dimensionally printed object in the manner previously discussed. The printing data may be associated with locations on the three-dimensionally printed object already and may be mapped to corresponding locations determined from the feature cloud or marking. The data generated during printing may include data measured during printing (e.g., temperature) or printer-specific information generated in preparation for printing (e.g., amount of agent to be used at various locations, amount of energy to deliver, etc.).

Block 304 may include generating a visual representation of the plurality of data points. For example, the data points may have values that do not correspond to visual representations, so the visual representations may be determined from the values, for example, as previously discussed. In an example, the values of the data points may be represented by color information, and the values may be scaled to a range of predetermined or user selected representations with color information.

At block 306, the method 300 may include generating an image that includes the visual representations of the plurality of data points. The generating of the image may include aligning the visual representations to the corresponding points in the image of the three-dimensionally printed object. For example, the mapping between data points and points in the image may be known from block 302, so each visual representation may be aligned with the point in the image mapped to the data point corresponding to the visual representation. Referring to FIG. 1, in an example, the alignment engine 120 may perform block 302, or the rendering engine 130 may perform block 304 or 306.

Figure 4:
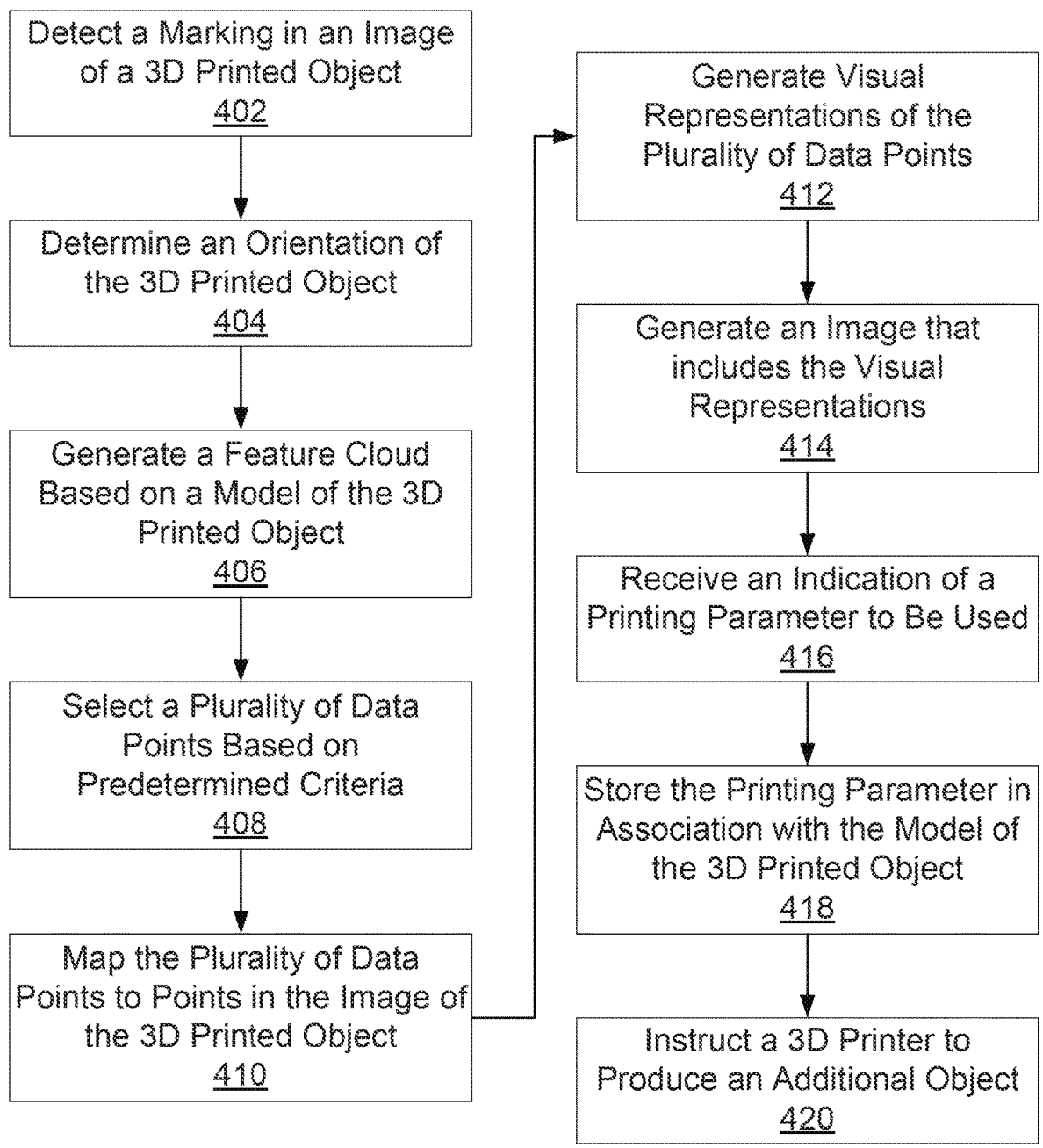
FIG. 4 is a flow diagram of another example method to generate images to overlay on a manufactured object.

FIG. 4 is a flow diagram of another example method 400 to generate images to overlay on a manufactured object. The method 400 is described in reference to a three-dimensionally printed object but may be applied to manufactured objects manufactured with techniques other than three-dimensional printing. A processor may perform the method 400. At block 402, the method 400 may include detecting a marking in an image of a three-dimensionally printed object. As previously discussed, the marking may be intentional or incidental and may be a unique identifier or a marking to distinguish symmetric features. An image may be analyzed to detect the marking. Block 404 may include determining an orientation of the three-dimensionally printed object in the image based on the marking. For example, the marking may not be symmetrical and thus may indicate the orientation of the object In an example, the marking may destroy symmetry of the object, and the orientation may be determined from the marking and other features of the object.

At block 406, the method 400 may include generating a feature cloud based on a model of the three-dimensionally printed object. The feature cloud may indicate the locations of features likely to be identifiable on the three-dimensionally printed object. The model may be analyzed to determine the features. In some examples, the location of the marking may allow for selection of a subset of the features that are most likely to be visible.

Block 408 may include selecting a plurality of data points from printing data based on comparing the printing data to a predetermined criterion. The predetermined criterion may include data points corresponding to a particular cross section, data points corresponding to a particular material or agent, data points corresponding to a physical property, or the like. The plurality of data points selected may be fewer than all data points of that data type for the three-dimensionally printed object.

At block 410, the method 400 may include mapping the plurality of data points from the printing data to points in an image of the three-dimensionally printed object. The plurality of data points may be the data points selected at block 408 and may be mapped based on aligning the feature cloud to the points in the image (e.g., features in the image). The mapping may otherwise be performed in a manner similar to that of block 302. Block 412 may include generating visual representations of the plurality of data points. The generating of the visual representations may be performed in a manner similar to that of block 304. At block 414, the method 400 may include generating an image that includes the visual representations of the plurality of data points. The generating of the image includes aligning the visual representations to the corresponding points in the image of the three-dimensionally printed object. The generating of the image may be performed in a manner similar to that of block 306.

Block 416 may include receiving a user indication of a printing parameter to be used during printing of additional three-dimensionally printed objects. For example, the user may determine that the printing parameter should be changed based on reviewing the image generated at block 414, e.g., to improve properties of the three-dimensionally printed objects. The printing parameter may include a maximum temperature, an amount of agent to deliver, a minimum distance to another object during printing, or the like. At block 418, the method 400 may include storing the printing parameter in association with a model of the three-dimensionally printed object or intermediate printing files for the printed object. For example, the printing parameter may be stored to a file of printing parameters, may be stored in a location accessible to a preprocessing engine or printer, or the like.

Figure 5:
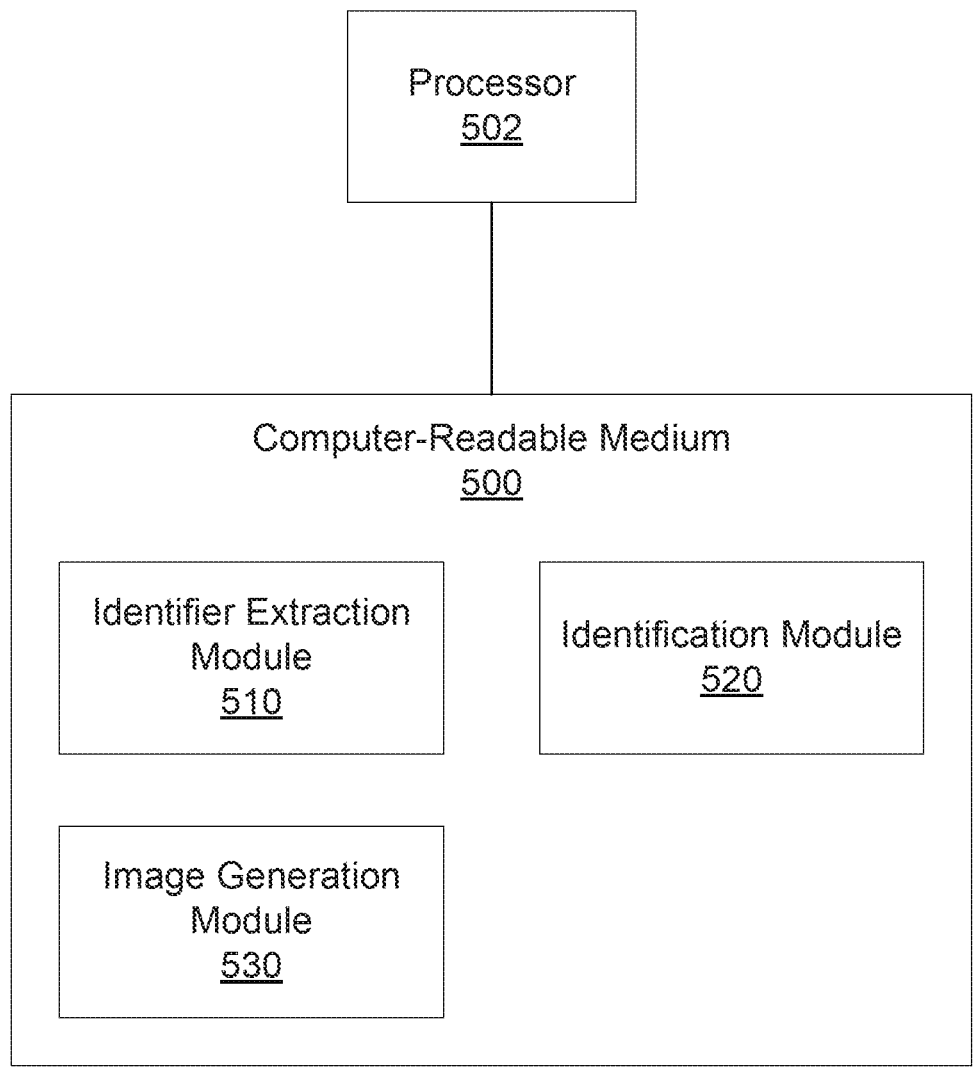
FIG. 5 is a block diagram of an example computer-readable medium including instructions that cause a processor to generate images to overlay on a manufactured object.

Block 420 may include instructing a three-dimensional printer to produce an additional object. For example, a link to print additional objects may be presented to the user, and the user may select the link. In some examples, the additional objects may be printed using the printing parameter stored at block 418. Thus, the user may be able to quickly and easily make adjustments to the printing process and print objects with the adjusted printing process. In an example, the identification engine 210 of FIG. 2 may perform block 402 or 408, the alignment engine 220 may perform block 404, 406, or 410, or the rendering engine 230 may perform block 412, 414, 416, 418, or 420, FIG. 5 is a block diagram of an example computer-readable medium 500 including instructions that, when executed by a processor 502, cause the processor 502 to generate images to overlay on a manufactured object. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include an identifier extraction module 510. As used herein, a "module" (in some examples referred to as a "software module") is a set of instructions that when executed or interpreted by a processor or stored at a processor-readable medium realizes a component or performs a method. The identifier extraction module 510 may include instructions that, when executed, cause the processor 502 to extract an identifier from an image of a manufactured object, such as a three-dimensionally printed object. For example, the identifier may be intentional or incidental. The identifier may be a unique identifier (e.g., a barcode, OR code, steganographic information, etc.). The identifier extraction module 510 may cause the processor 510 to determine a value based on the identifier, such as by determining numerical representations for elements of the identifier.

The computer-readable medium 500 may include an identification module 520. The identification module 520 may cause the processor 502 to determine production data associated with manufacturing of the manufactured object based on the identifier. For example, the production data may be stored in the computer-readable medium 500 or a different computer-readable medium. The identification module 520 may cause the processor 502 to look up which production data corresponds to the value determined based on the identifier. The identification module may cause the processor 502 to retrieve the production data or a portion of the production data associated with the identifier.

The computer-readable medium 500 may include an image generation module 530. The image generation module 530 may cause the processor 502 to generate an image including a visual representation of the production data to be overlaid on a view of the manufactured object. For example, the image generation module 530 may cause the processor 502 to determine representations for values of data points in the production data (e.g., representation using color information). The image generation module 530 may cause the processor 502 to set values of picture elements based on the representations. In an example, when executed by the processor 502, the identifier extraction module 510 or the identification module 520 may realize the identification engine 110 of FIG. 1, or the image generation module 530 may realize the rendering engine 130.

Figure 6:
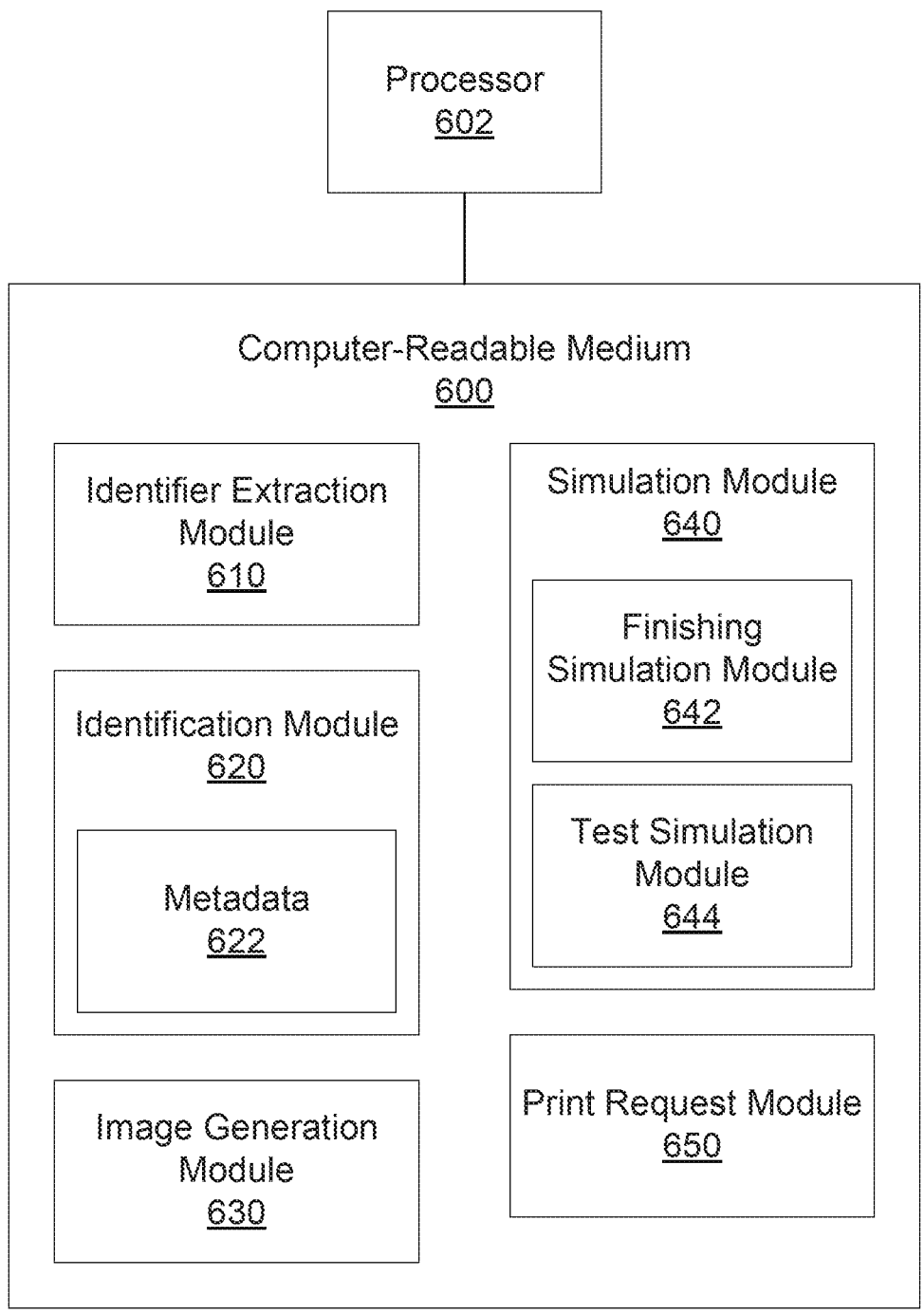
FIG. 6 is a block diagram of another example computer-readable medium including instructions that cause a processor to generate images to overlay on a manufactured object.

FIG. 6 is a block diagram of another example computer-readable medium 600 including instructions that, when executed by a processor 602, cause the processor to generate images to overlay on a manufactured object. The computer-readable medium 600 may include an identifier extraction module 610. The identifier extraction module 610 may cause the processor 602 to extract an identifier from an image of a manufactured object in the manner similar to that cause by the identifier extraction module 510 of FIG. 5.

The computer-readable medium may include an identification module 620, The identification module 620 may cause the processor 602 to determine production data associated with manufacturing of the manufactured object based on the identifier. The identification module 620 may include instructions similar to those of the identification module 520 of FIG. 5, In some examples, the production data may include metadata 622, which may be stored in the computer-readable medium 600, Alternatively, the metadata 622 may be stored separately from the computer-readable medium 600. The metadata 622 may include metadata for a design file for the manufactured object (e.g., a file name, author, date, design engine version, etc.), notes by the author of the design file or by a later user (e.g., notes determined while viewing the manufactured object with overlaid information), metadata associated with pre-manufacturing or manufacturing (e.g., date of preprocessing, date of manufacture, preprocessing engine version, three-dimensional printer version, a link to request production of additional objects, etc.), or the like.

The computer-readable medium 600 may include an image generation module 630. The image generation module 630 may cause the processor 602 to generate an image including a visual representation of the production data to be overlaid on a view of the manufactured object. The image generation module 630 may include instructions similar to those of the image generation module 530 of FIG. 5.

The computer-readable medium 600 may include a simulation module 640. The simulation module 640 may cause the processor 602 to simulate results of a process acting on the manufactured object. The production data may include the results of the process simulated. The simulation module 640 may cause the processor 602 to simulate the results of the process prior to the identification module 620 causing the processor 602 to determine the production data, in response to the identification module 620 doing so, or the like.

The simulation module 640 may include a finishing simulation module 642. The finishing simulation module 642 may cause the processor 602 to simulate the results of a finishing process applied to the manufactured object, such as tumbling, dyeing, sand blasting, agent application, etc. The simulation module 640 may include a test simulation module 644. The test simulation module 644 may cause the processor 602 to simulate the results of a test process, such as a wind tunnel simulation, computational fluid dynamics calculations, deformation resulting from drop, impact, or forming simulation, or the like. The identification module 620 may cause the processor 602 to retrieve production data including the results from the simulation module 640, the finishing simulation module 642, or the test simulation module 644.

The computer-readable medium 600 may include a print request module 650. The print request module 650 may cause the processor 602 to instruct a manufacturing device, such as a three-dimensional printer, to produce an additional manufactured object. For example, the metadata may include a link to request production of additional objects. The print request module 650 may cause the processor 602 to instruct the manufacturing device to produce the additional manufactured object in response to a user selecting the link. In some examples, the metadata may include notes or changes to manufacturing parameters. The print request module 650 may cause the processor 602 to instruct the manufacturing device to use information from the notes or to use the changed manufacturing parameters to produce the additional manufactured object. Referring to FIG. 2, in an example, when executed by the processor 602, the identifier extraction module 610 or the identification module 620 may realize the identification engine 210, the image generation module 630 or the print request module 650 may realize the rendering engine 230, or the simulation module 640, the finishing simulation module 642, or the test simulation module 644 may realize the simulation engine 244.

Figure 7:
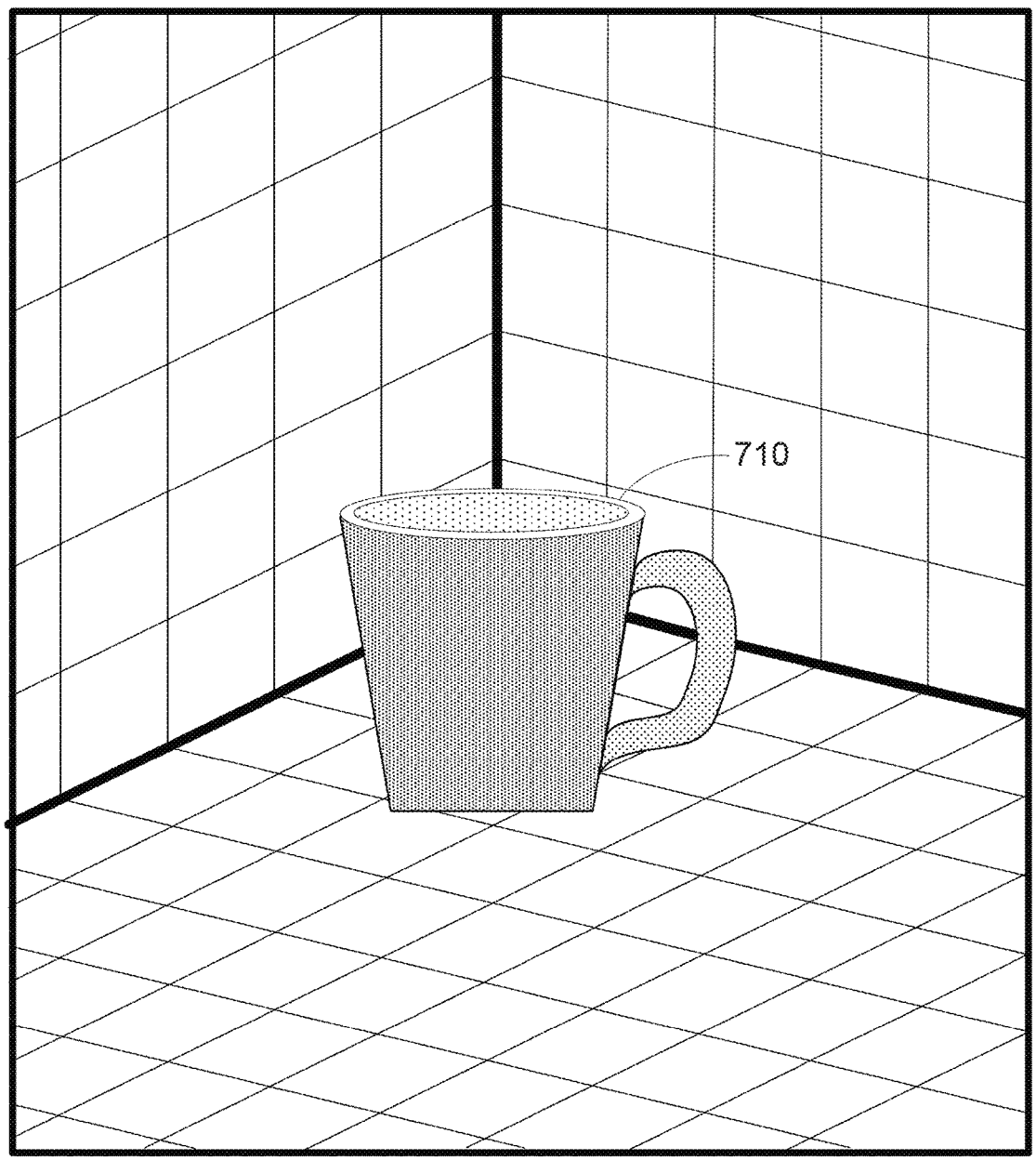
FIG. 7 is a plan view of example content to be displayed on a display device.

FIG. 7 is a plan view of example content 700 to be displayed on a display device. The example content 700 may include a manufactured object 710. In the illustrated example, the production data is overlaid on the manufactured object 710 as patterns with different densities of dots. For example, the different densities of dots may correspond to different temperatures, different materials, different amounts of agents or materials used, different mechanical, electrical, or optical properties, etc. In other examples, color information or the like may be used to represent different values in the production data.

The above description is illustrative of various principles and implementations of the present disclosure. Numerous variations and modifications to the examples described herein are envisioned. Accordingly, the scope of the present application should be determined only by the following claims.

What is claimed is:

1. A smartphone comprising:
   an imaging device to capture images of a three-dimensionally printed object; a display device;
   an identification engine to determine production data associated with the three-dimensionally printed object;
   an alignment engine to determine a placement of the three-dimensionally printed object relative to the display device; and
   a rendering engine to generate an image including a visual representation of the production data, the rendering engine to position the visual representation of the production data so that representations of data points in the production data will overlay corresponding portions of the three-dimensionally printed object upon displaying by the display device, wherein the image includes image information comprising orientation of the three-dimensionally printed object during its manufacture and an outline of a print volume during the manufacture of the three-dimensionally printed object.

2. The smartphone of claim 1, wherein the identification engine is to read a unique identifier from a surface of the three-dimensionally printed object and to determine the production data based on the unique identifier, and wherein the alignment engine is to determine the placement of the three-dimensionally printed object based on the unique identifier.

3. The smartphone of claim 1, wherein the production data includes data generated during printing of the three-dimensionally printed object.

4. The smartphone of claim 1, wherein the placement includes a placement selected from the group consisting of a position in an image plane, an orientation, and a size in the image of the three-dimensionally printed object.

5. The smartphone of claim 1, wherein the rendering engine is to transmit the image to the display device, the display device is to adjust the image to compensate for movement of the display device after the determination of the position by the alignment engine, and the display device is to display the image as adjusted.

6. A method, comprising:
   mapping a plurality of data points from printing data generated during printing of a three-dimensionally printed object to corresponding points in an image of the three-dimensionally printed object, wherein the image was captured by an imaging device of a smartphone;
   generating visual representations of the plurality of data points;
   generating an image that includes the visual representations of the plurality of data points, wherein the generating of the image includes aligning the visual representations to the corresponding points in the image of the three-dimensionally printed object, wherein the image includes image information comprising orientation of the three-dimensionally printed object during its manufacture and an outline of a print volume during the manufacture of the three-dimensionally printed object; and displaying, by a display device of the smartphone, the generated image.

7. The method of claim 6, further comprising selecting the plurality of data points based on comparing the printing data to a predetermined criterion, wherein the predetermined criterion includes a criterion selected from the group consisting of data points corresponding to a cross section, data points corresponding to an agent, and data points corresponding to a physical property.

8. The method of claim 6, further comprising receiving a user indication of a printing parameter to be used during printing of additional three-dimensionally printed objects, and storing the printing parameter in association with a model of the three-dimensionally printed object, wherein the printing parameter includes a parameter selected from the group consisting of a maximum temperature, an amount of agent to deliver, and a minimum distance to another object during printing.

9. The method of claim 6, further comprising detecting a marking in the image of the three-dimensionally printed object, and determining an orientation of the three-dimensionally printed object in the image based on the marking.

10. The method of claim 6, further comprising generating a feature cloud based on a model of the three-dimensionally printed object, wherein mapping the plurality of data points comprises mapping the plurality of data points to the points in the image of the three-dimensionally printed object based on the feature cloud, and wherein the feature cloud comprises features of the three-dimensionally printed object and locations of the features of the three-dimensionally printed object.

11. A non-transitory computer-readable medium comprising instructions that, when executed by a processor, cause the processor to:

extract an identifier from an image of a manufactured object, wherein the image was captured by an imaging device of a smartphone;

determine production data associated with manufacturing of the manufactured object based on the identifier;

generate an image including a visual representation of the production data to be overlaid on a view of the manufactured object, wherein the image includes image information comprising orientation of the three-dimensionally printed object during its manufacture and an outline of a print volume during the manufacture of the three-dimensionally printed object; and display, by a display device of the smartphone, the generated image.

12. The non-transitory computer-readable medium of claim 11, wherein the instructions cause the processor to simulate results of a process acting on the manufactured object, and wherein the production data includes the results of the process.

13. The non-transitory computer-readable medium of claim 12, wherein the process includes a process selected from the group consisting of a finishing process applied to the three-dimensionally printed object and a test process.

14. The non-transitory computer-readable medium of claim 11, wherein the production data includes metadata associated with the manufactured object.

15. The non-transitory computer-readable medium of claim 14, wherein the metadata includes a link to request production of additional objects, and wherein the instructions cause the processor to instruct a three-dimensional printer to produce an additional manufactured object.

* * * * *